US012118955B2

(12) United States Patent
Zhu et al.

(10) Patent No.: US 12,118,955 B2
(45) Date of Patent: Oct. 15, 2024

(54) DRIVING METHOD AND DRIVING CIRCUIT OF DISPLAY PANEL, AND DISPLAY DEVICE

(71) Applicant: HKC CORPORATION LIMITED, Shenzhen (CN)

(72) Inventors: Long Zhu, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/337,607

(22) Filed: Jun. 20, 2023

(65) Prior Publication Data

US 2024/0087542 A1 Mar. 14, 2024

(30) Foreign Application Priority Data

Sep. 9, 2022 (CN) ........................ 202211102368.X

(51) Int. Cl.
*G09G 3/36* (2006.01)
*G09G 3/20* (2006.01)

(52) U.S. Cl.
CPC ......... *G09G 3/3655* (2013.01); *G09G 3/2007* (2013.01); *G09G 3/3614* (2013.01); *G09G 2300/0452* (2013.01); *G09G 2320/0233* (2013.01); *G09G 2320/0242* (2013.01)

(58) Field of Classification Search
CPC .. G09G 3/3655; G09G 3/2007; G09G 3/3614; G09G 2300/0452; G09G 2300/0426; G09G 2320/0233; G09G 2320/0242; G09G 2320/0252
See application file for complete search history.

(56) References Cited

U.S. PATENT DOCUMENTS

2004/0135938 A1* 7/2004 Choi .................... G09G 3/3655 349/108
2013/0265347 A1* 10/2013 Bae ...................... G09G 3/3655 345/691
2014/0232624 A1* 8/2014 Kim ..................... G09G 3/3607 345/87

(Continued)

FOREIGN PATENT DOCUMENTS

CN 103996383 A 8/2014
CN 104882106 A 9/2015

(Continued)

*Primary Examiner* — David Tung
(74) *Attorney, Agent, or Firm* — Maier & Maier, PLLC

(57) ABSTRACT

A driving method and a driving circuit for a display panel, and a display device. In the driving method, a binding-point voltage is first detected and a voltage difference between the binding-point voltage and a common-electrode voltage is obtained through a calculation. In case that the voltage difference between the binding-point voltage and the common-electrode voltage is smaller than a preset voltage difference, an existence of a problem of bright and dark lines on the display panel is indicated, the data voltage waveform has a ramp-up, and a charging rate of a blue pixel or a green pixel is insufficient, in this case, the binding-point voltage, i.e., a charging voltage of the red pixel is boosted to reduce a charging loss during a ramp-up process, and to increase the charging rate, so that the bright and dark lines of the display panel can be improved, thereby improving the display effect.

20 Claims, 9 Drawing Sheets

(56) References Cited

U.S. PATENT DOCUMENTS

| | | | | |
|---|---|---|---|---|
| 2018/0061357 | A1* | 3/2018 | Lee | G09G 3/3688 |
| 2019/0043429 | A1* | 2/2019 | Yu | G09G 3/2092 |
| 2019/0051235 | A1* | 2/2019 | Zhang | G09G 3/3225 |
| 2022/0293023 | A1* | 9/2022 | Zhou | G09G 3/3208 |

FOREIGN PATENT DOCUMENTS

| | | | |
|---|---|---|---|
| CN | 105529008 | A | 4/2016 |
| CN | 108847194 | A | 11/2018 |
| CN | 109036327 | A | 12/2018 |
| CN | 109308882 | A | 2/2019 |
| CN | 109509455 | A | 3/2019 |
| CN | 109584827 | A | 4/2019 |
| CN | 109658869 | A | 4/2019 |
| CN | 109658892 | A | 4/2019 |
| CN | 109712580 | A | 5/2019 |
| CN | 110648643 | A | 1/2020 |
| CN | 111862889 | A | 10/2020 |
| CN | 112951172 | A | 6/2021 |
| CN | 113571025 | A | 10/2021 |
| CN | 114530129 | A | 5/2022 |
| CN | 115691381 | A | 2/2023 |
| KR | 1999011728 | A | 2/1999 |
| KR | 1020050037052 | A | 4/2005 |
| KR | 1020060112980 | A | 11/2006 |

* cited by examiner

DRIVING METHOD AND DRIVING CIRCUIT OF DISPLAY PANEL, AND DISPLAY DEVICE

CROSS-REFERENCE TO RELATED APPLICATION

Pursuant to 35 U.S.C. § 119 and the Paris Convention, this application claims the benefit of Chinese Patent Application No. 202211102368.X filed on Sep. 9, 2022, the content of which is incorporated herein by reference.

TECHNICAL FIELD

The present application relates to the field of display technology, and in particular, to a driving method and a driving circuit for a display panel, and a display device.

BACKGROUND

The statements provided herein are merely background information related to the present application, and do not necessarily constitute any prior arts. With the rapid development of information technology, people have higher and higher requirements for visual senses. This is also full of challenges and expectations for the display industry with TFT-LCD as the mainstream, to enable consumers to have a better visual experience. Flip (pixel flipping) architecture and the corresponding flipping mode can achieve the effect of dot inversion, resulting in the most uniform panel display. Among them, the display screen with high frequency is also widely used at present, but the charging time of high frequency may be insufficient. BG (water blue) color mixed screens will have charging differences between different rows of pixels, and the charging difference will be more obvious when the charging time is insufficient. Visual differences in brightness, that is, bright and dark lines will occur when the charging of pixels in different rows are different.

The main reason for the difference between brightness and darkness is that, in the two-color mixed color screen, the actual data waveform will be delayed when the polarity is reversed, the data voltage waveform has a climbing ramp when converting from a red pixel to a blue or green pixel. At this time, a charging rate of the blue or green pixel will be lower than that of a pixel which is not converted from the red pixel, resulting in bright and dark lines.

SUMMARY

An objective of the present application is to provide a driving method for a display panel, which aims to improve a problem of bright and dark lines in a traditional display panel by increasing a binding-point voltage of a blue pixel or a green pixel.

In accordance with a first aspect of the embodiments of the present application, a driving method for a display panel is provided, the display panel includes a plurality of data lines, a plurality of scan lines and a plurality of pixel groups arranged in an array. Each pixel group includes a red pixel, a green pixel and a blue pixel arranged in sequence along a row direction. Multiple pixels in the same column are sequentially cross-connected to data lines in two adjacent columns, and multiple pixels in the same row are respectively connected to data lines in different columns. A binding-point voltage corresponding to a gray scale of a binding point of the green pixel or the blue pixel is equal to a charging voltage of the red pixel.

The driving method for the display panel includes steps of: detecting the binding-point voltage, and obtaining, through a calculation, a voltage difference between the binding-point voltage and a common-electrode voltage; boosting the binding-point voltage to a preset binding-point voltage in case that the voltage difference between the binding-point voltage and the common-electrode voltage is smaller than a preset voltage difference; and performing a line-by-line scan charging on each row of pixels by using the boosted binding-point voltage, to charge the green pixel or the blue pixel to a charging voltage corresponding to a target gray scale, and to charge the red pixel to the preset binding-point voltage.

Optionally, the binding-point voltage includes a binding-point voltage of positive polarity and a binding-point voltage of negative polarity, and the preset binding-point voltage includes a preset binding-point voltage of positive polarity and a preset binding-point voltage of negative polarity.

The step of boosting the binding-point voltage to a preset binding-point voltage in case that the voltage difference between the binding-point voltage and the common-electrode voltage is smaller than a preset voltage difference specifically includes steps of: boosting the binding-point voltage of positive polarity to the preset binding-point voltage of positive polarity in case that the voltage difference between the binding-point voltage of positive polarity and the common-electrode voltage is smaller than the preset voltage difference; and boosting the binding-point voltage of negative polarity to the preset binding-point voltage of negative polarity in case that the voltage difference between the binding-point voltage of negative polarity and the common-electrode voltage is smaller than the preset voltage difference.

Optionally, the driving method also includes a step of boosting the binding-point voltage to the preset binding-point voltage and increasing a charging time of each pixel to a preset charging time in case that the voltage difference between the binding-point voltage and the common-electrode voltage is smaller than the preset voltage difference.

Optionally, the charging time is equal to a difference between a refresh time and a dead time of each row of pixels.

The step of boosting the binding-point voltage and increasing the charging time of each pixel specifically includes steps of: maintaining the refresh time of each row of pixels unchanged, and increasing the charging time of each pixel to the preset charging time in case that the voltage difference between the binding-point voltage and the common-electrode voltage is smaller than the preset voltage difference; or alternatively, maintaining the dead time of each row of pixels unchanged, and increasing the refresh time of each pixel, to enable the charging time of each pixel to be increased to the preset charging time in case that the voltage difference between the binding-point voltage and the common-electrode voltage is smaller than the preset voltage difference.

Optionally, the driving method also includes a step of invoking data in a preset data mapping table to perform a voltage compensation on a target voltage corresponding to the target gray scale of the green pixel and the blue pixel, and to perform the voltage compensation on the charging voltage of the red pixel.

Optionally, the step of invoking data in the preset data mapping table to perform the voltage compensation on a target voltage corresponding to the target gray scale of the green pixel and the blue pixel, and to perform the voltage compensation on the charging voltage of the red pixel specifically include steps of: obtaining the target voltage corresponding to the target gray scale of the green pixel and the blue pixel of each row to be scanned and the preset binding-point voltage; invoking a compensation voltage mapped with each target voltage and the preset binding point voltage in the preset data mapping table according to the target voltage corresponding to the target gray scale of the green pixel and the blue pixel of each row to be scanned and the preset binding-point voltage; and outputting the compensation voltage to perform the voltage compensation on the target voltage and the preset binding-point voltage of each row of pixels to be scanned.

Optionally, a magnitude of the compensation voltage is in a positive correlation with the target voltage of each row of pixels and the magnitude of the preset binding-point voltage.

Optionally, the driving method also includes a step of inverting the polarity of each of the data lines in a frame inversion mode and/or in a column inversion mode. The frame inversion mode is that a polarity of a data line in one frame and a polarity of the same data line in an adjacent frame are opposite. The column inversion mode is that the polarities of adjacent data lines in the same frame are opposite.

In accordance with a second aspect of the embodiments of the present application, a driving circuit for a display panel is provided, including a source drive circuit, a gate drive circuit, and a timing controller. The timing controller is connected to the source drive circuit and the gate drive circuit respectively. The source drive circuit is connected to data lines of the display panel, and the gate drive circuit is also connected to scan lines of the display panel. The timing controller includes a memory, a processor and a display-panel driver program stored on the memory and executable on the processor, the processor implements the above-mentioned driving method for the display panel when the display panel driver program is executed by the processor.

In accordance with a third aspect of the embodiments of the present application, a display device is provided, including a backlight source, a display panel, and the above-mentioned driving circuit for the display panel. The display panel is correspondingly connected to the driving circuit for the display panel.

Compared with the conventional arts, the embodiments of the present application have the following beneficial effects: in the above driving method for the display panel, the binding-point voltage is detected first and the voltage difference between the binding-point voltage and the common-electrode voltage is calculated. In case that the voltage difference of the electrode voltage is smaller than the preset voltage difference, an existence of the problem of bright and dark lines on the display panel is indicated, a waveform of data voltage has a ramp-up, and the charging rate of the blue pixel or green pixel is insufficient, in this case, the binding-point voltage, i.e., the charging voltage of the red pixel is boosted to reduce a charging loss during a ramp-up process, and to increase the charging rate, thus the bright and dark lines of the display panel can be improved, thereby improving the display effect.

DETAILED DESCRIPTION

To make the objectives, solutions and beneficial effects of the present application more comprehensible, the present application will be further described in detail below with reference to the drawings and embodiments. It should be understood that specific embodiments described herein are only used to explain the present application, and are not intended to limit the present application.

In addition, the terms "first" and "second" are used for descriptive purposes only and should not be understood as indicating or implying relative importance or as implicitly indicating the number of features indicated. Thus, a feature defined with "first" and "second" may explicitly or implicitly include one or more such features. In the description of the present application, the phrase "a/the plurality of" means two or more, unless otherwise expressly and specifically limited.

A first aspect of the embodiments of the present application provides a driving method for a display panel 1.

Figure 1:
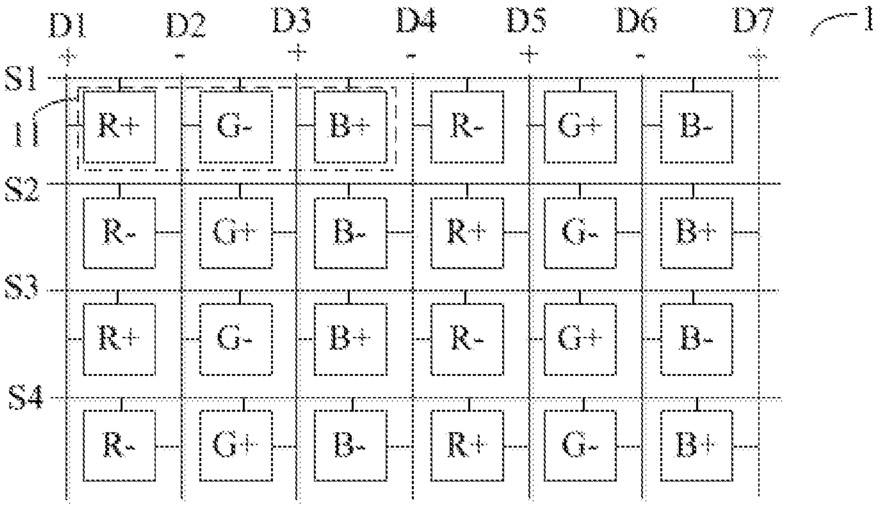
FIG. 1 is a schematic structural diagram for a display panel in accordance with an embodiment of the present application.
Figure 2:
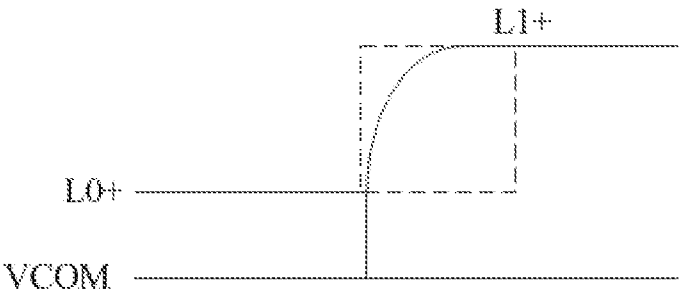
FIG. 2 is a schematic diagram of a first waveform of pixel charging in accordance with an embodiment of the present application.

In an embodiment, as shown in FIG. 1, the display panel 1 includes a plurality of data lines, a plurality of scan lines, and a plurality of pixel groups 11 arranged in an array. Each pixel group includes red pixels R, green pixels G and blue pixel B arranged in sequence along a row direction, multiple pixels in the same column are sequentially cross-connected to the data lines of two adjacent columns, and multiple pixels in the same row are respectively connected to data lines in different columns, and pixels in each row are connected to the same scan line. The scan line may be provided as a single line arranged between pixels in adjacent rows or may be provided as double lines arranged between pixels in adjacent rows, the arrangement of data lines may have no limitations in here, and pixels in the same column are pixels of the same type. For example, a red pixel R in the first row of the first column is connected to a first scan line S1 and a first data line D1; a red pixel R in the second row of the first column is connected to a second data line D2 and a second scan line S2; a red pixel R in the third row of the first column is connected to a third scan line S3 and the first data line D1; and a red pixel R in the fourth row of the first column is connected to a fourth scan line S4 and the second data line D2. The binding-point voltage corresponding to a gray scale of a binding point of the green pixel G or blue pixel B on the same data line is equal to the charging voltage of an adjacent red pixel R in the previous row on the same data line. The green pixel G or blue pixel B on the same data line, when charged by a scan line, is charged on the basis of the target charging voltage of the red pixel R of the previous row of pixels, such as the red pixel R of the second row and the green pixel G of the third row connected to the data line of the second column, as shown in FIG. 2

In the water-blue mixed color screen, the charging voltage of the red pixel is equal to the voltage of gamma7 or gamma8, and the liquid crystal does not flip, so that the brightness of the liquid crystal is basically in an opaque state, and the corresponding area of the display panel is displayed as a black picture with the lowest energy consumption, which will not cause any impact on the display screen. After the red pixel R in the previous row is charged from the common-electrode voltage VCOM to a charging voltage L0+ of the red pixel R, that is, to a voltage of gamma7 or gamma8, the green pixel G is charged and boosted on the basis of the charging voltage of the red pixel R until the voltage of the green pixel G is boosted to a target voltage L1+ corresponding to a target gray scale, a switching of high-and-low voltage of the green pixel G and the red pixel R is existed. Or alternatively, for the red pixel R of the first row and the blue pixel B of the second row connected to the fourth data line D4, the blue pixel B is charged and boosted on the basis of the charging voltage of the red pixel R until the voltage of the blue pixel B is boosted to the target voltage L1+ corresponding to the target gray scale, after the red pixel R in the previous row is charged from the common-electrode voltage VCOM to the charging voltage L0+ of the red pixel R, and a switching of high-and-low voltage of the blue pixel B and the red pixel R is existed. While for the blue pixel B and the green pixel G connected to the third data line D3 and the sixth data line D6, since both the blue and green pixels are charged on the basis of the charging voltage of the red pixel R, the voltage difference between the blue pixel and the green pixel has little change. Therefore, no switching between high and low voltages occurs, and the corresponding charging rate of pixel is high, a variation in brightness of the blue and green pixels is not large, which will not cause the problem of brightness and darkness lines. Due to the delay in the actual data waveform when the polarity is reversed, the data voltage waveform has a ramp when converting from the red pixel R to the blue pixel B or green pixel G, and the charging rate of the green pixel G or blue pixel B will be lower than that of the pixel which is not converted from the red pixel R, resulting in a difference in brightness, which then will cause bright and dark lines.

Figure 3:
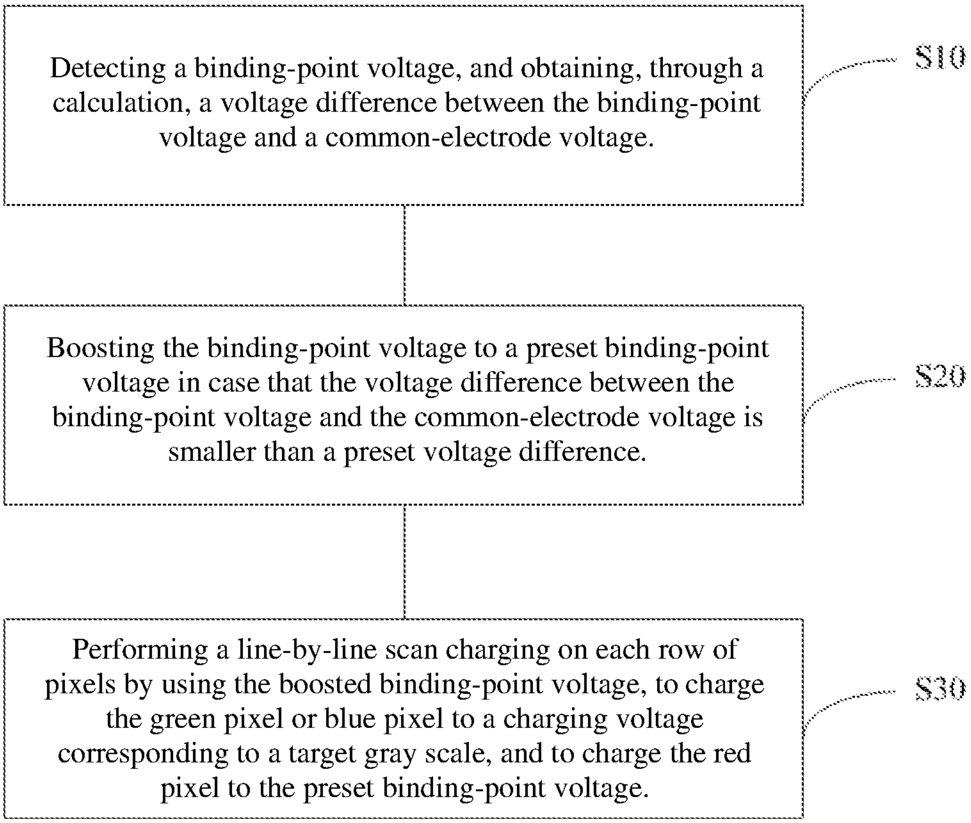
FIG. 3 is a schematic flowchart of a driving method for the display panel in accordance with an embodiment of the present application.

To improve the problem of bright and dark lines, as shown in FIG. 3, a driving method for the display panel 1 is provided in this embodiment, which includes steps S10 to S30.

In step S10, a binding-point voltage is detected, and a voltage difference between the binding-point voltage and a common-electrode voltage VCOM is calculated.

In step S20, the binding-point voltage is boosted to a preset binding-point voltage in case that the voltage difference between the binding-point voltage and the common-electrode voltage VCOM is smaller than a preset voltage difference.

In step S30: a line-by-line scan charging is performed on each row of pixels by using the boosted binding-point voltage, to charge the green pixel or the blue pixel to a charging voltage corresponding to a target gray scale, and to charge the red pixel to the preset binding-point voltage.

Figure 4:
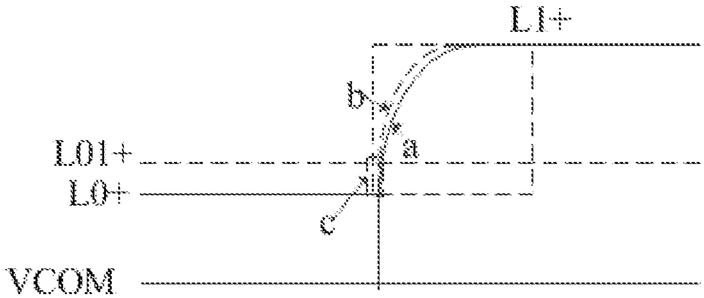
FIG. 4 is a schematic diagram of a second waveform of pixel charging in accordance with an embodiment of the present application.

In this embodiment, the binding-point voltage is detected by a voltage detection module, and the common-electrode voltage is obtained directly or through detection, and the voltage difference between the binding-point voltage and the common-electrode voltage is calculated, in this embodiment, when the voltage difference between the binding-point voltage and the common-electrode voltage is smaller than the preset voltage difference, that is, there is a large voltage difference between the binding-point voltage and the charging voltage corresponding to the target gray scale, and a waveform of data voltage has a ramp, at this time, a charging rate of the green pixel G or blue pixel B will be higher than that of the pixel which is not converted from the red pixel, resulting in brightness differences and appearing bright and dark lines. The binding-point voltage output to the display panel 1 is adjusted directly by a drive device, or a corresponding driving circuit 2 is controlled by the drive device to adjust the binding-point voltage output to the display panel 1. As shown in FIG. 4, the charging voltage of the red pixel R is boosted, that is, the voltage of gamma7 or gamma8 is boosted, and then the binding-point voltage of the green pixel G or blue pixel B is boosted to the preset binding-point voltage. After the binding-point voltage of the green pixel G or blue pixel B is boosted, a charging loss caused by the climbing will be reduced when the red pixel R climbs up to the blue pixel B. For example, in FIG. 4, a represents a charging curve before the binding-point voltage is adjusted, and b represents the charging curve after the binding-point voltage is adjusted, c represents an initial charging loss before and after adjustment, the charging loss is reduced by adjusting the binding-point voltage, the charging rate of the green pixel G or blue pixel B is improved, the brightness difference is reduced, which improves the problem of bright and dark lines, and then improves the display effect.

Meanwhile, the binding-point voltage of each pixel may be equal or different, and the target voltage corresponding to the target gray scale of each pixel may be equal or different, which can be adjusted according to the display requirements during a line driving process.

In this embodiment, the voltage difference refers to an absolute voltage difference, i.e., an absolute value of the difference between the binding-point voltage and the common-electrode voltage VCOM.

Compared with the prior arts, the embodiment of the present application has the following beneficial effect: in the driving method for the display panel 1, the binding-point voltage is detected and the voltage difference between the binding-point voltage and the common-electrode voltage VCOM is calculated. In case that the voltage difference between the binding-point voltage and the common-electrode voltage VCOM is smaller than the preset voltage difference, an existence of the problem of bright and dark lines on the display panel 1 is indicated, the waveform of data voltage has a ramp-up, and the charging rate of the blue pixel B or green pixel G is insufficient, in this case, the binding-point voltage, i.e., the charging voltage of the red pixel R is boosted to reduce the charging loss during a ramp-up process, and to increase the charging rate, thus the bright and dark lines on the display panel 1 can be improved, thereby improving the display effect.

Figure 5:
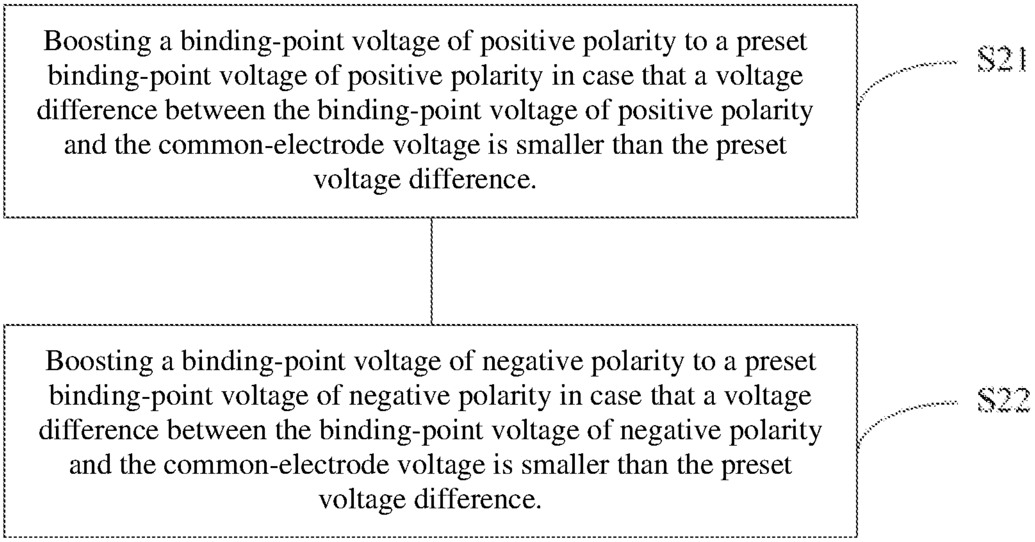
FIG. 5 is a schematic flowchart of step S20 in a driving method for the display panel in accordance with another embodiment of the present application.
Figure 6:
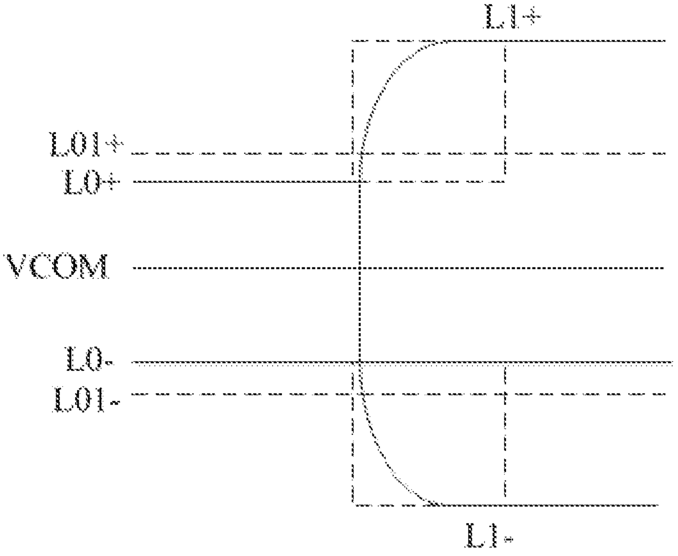
FIG. 6 is a schematic waveform diagram of pixel charging in accordance with another embodiment of the present application.

As shown in FIG. 5 and FIG. 6, optionally, the binding-point voltage includes a binding-point voltage of positive polarity and a binding-point voltage of negative polarity, and the preset binding-point voltage includes a preset binding-point voltage of positive polarity and a preset binding-point voltage of negative polarity.

The step of boosting the binding-point voltage to the preset binding-point voltage in case that the voltage difference between the binding-point voltage and the common-electrode voltage is smaller than the preset voltage difference specifically includes steps S21 and S22.

In step S21, the binding-point voltage of positive polarity is boosted to the preset binding-point voltage of positive polarity in case that the voltage difference between the binding-point voltage of positive polarity and the common-electrode voltage VCOM is smaller than the preset voltage difference.

In step S22, the binding-point voltage of negative polarity is boosted to the preset binding-point voltage of negative polarity in case that the voltage difference between the binding-point voltage of negative polarity and the common-electrode voltage VCOM is smaller than the preset voltage difference.

In this embodiment, corresponding to different driving modes of a dot inversion of the display panel 1, the binding-point voltage has a corresponding positive or negative polarity. The positive polarity refers to that the binding-point voltage is greater than the common-electrode voltage VCOM, and the negative polarity refers to that the binding-point voltage is lower than the common-electrode voltage VCOM.

It can be understood that an average value of the binding-point voltage of positive polarity and the binding-point voltage of negative polarity is equal to the common-electrode voltage. Therefore, after the magnitude of one binding-point voltage is obtained, the magnitude of the other binding-point voltage of opposite polarity, as well as the voltage difference between the other binding-point voltage of opposite polarity and the common-electrode voltage can be obtained.

The binding-point voltage of positive polarity and/or the binding-point voltage of negative polarity are obtained through a detection. In case that the voltage difference between the binding-point voltage of positive or negative polarity and the common-electrode voltage is detected to be smaller than the preset voltage difference, indicating that the data signal has a ramp-up, and the problem of bright and dark lines is existed, the binding-point voltage of positive polarity and the binding-point voltage of negative polarity are boosted simultaneously, as shown in FIG. 6, the binding-point voltage of positive polarity is boosted from L0+ to the preset binding-point voltage of positive polarity L01+, and the binding-point voltage of negative polarity is boosted from L0− to the preset binding-point voltage of negative polarity L01−, and the line-by-line scan charging is performed on each row of pixels by using the boosted binding-point voltage of positive polarity L01+ and the boosted binding-point voltage of negative polarity L01−, to enable the blue pixel B or the green pixel G to be charged to a charging voltage of positive polarity or a charging voltage of negative polarity corresponding to the target gray scale of the blue pixel B or the green pixel G, and to enable the red pixel R to be charged to the corresponding charging voltage.

For example, as shown in FIG. 1, with regard to the red pixel R and the green pixel G arranged diagonally in two adjacent rows on the fifth data line D5, when it is detected that the voltage difference between the binding-point voltage of positive or negative polarity and the common-electrode voltage VCOM is smaller than the preset voltage difference, the binding-point voltage of positive polarity of the green pixel G in the fifth column and the third row is boosted from L0+ to the preset binding-point voltage of positive polarity L01+, that is, the charging voltage of positive polarity of the red pixel R in the fourth column and the second row is boosted from L0+ to L01+, which increases the charging rate and improves bright and dark lines.

Or alternatively, with regard to the red pixel R and the blue pixel B arranged diagonally in two adjacent rows on the third data line D4, when it is detected that the voltage difference between the binding-point voltage of positive or negative polarity and the common-electrode voltage VCOM is smaller than the preset voltage difference, the binding-point voltage of negative polarity of the blue pixel B in the third column and the second row is boosted from the binding-point voltage L0− to the preset binding-point voltage of negative polarity L01−, that is, the charging voltage of the positive polarity of the red pixel R in the fourth column and the first row is boosted from L0− to L01−, which increases the charging rate and improves bright and dark lines.

Figure 7:
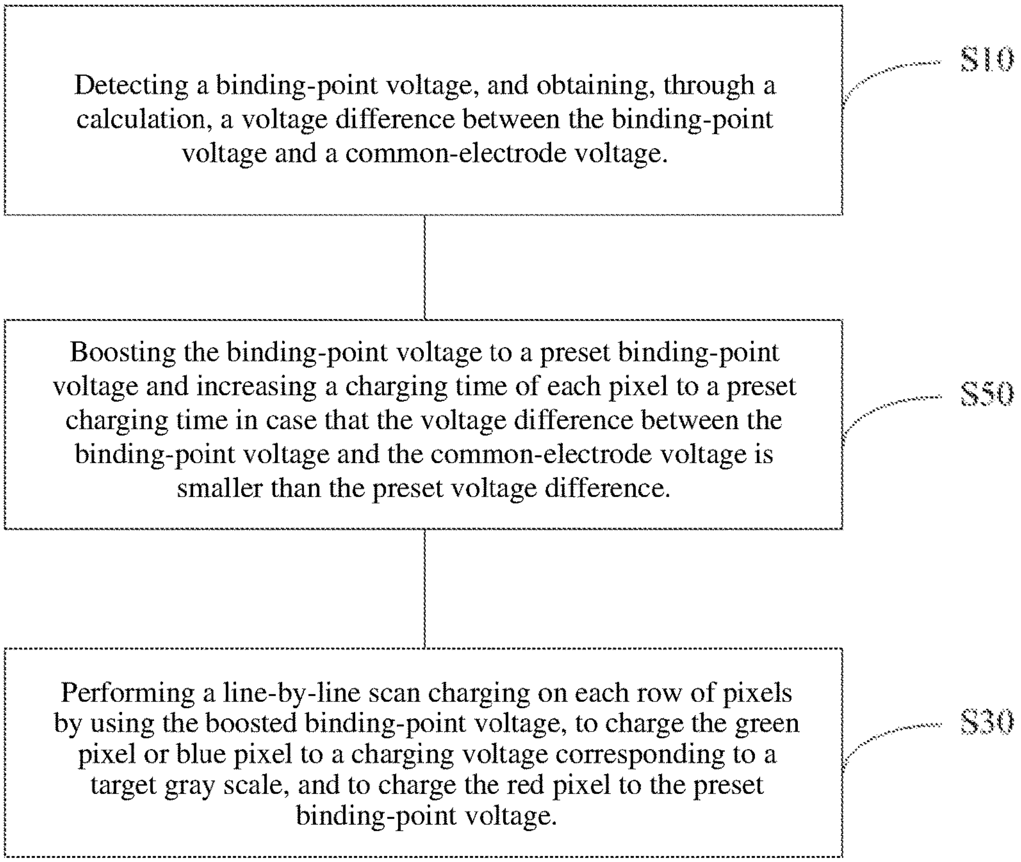
FIG. 7 is a schematic flowchart of a driving method for the display panel in accordance with another embodiment of the present application.
Figure 8:
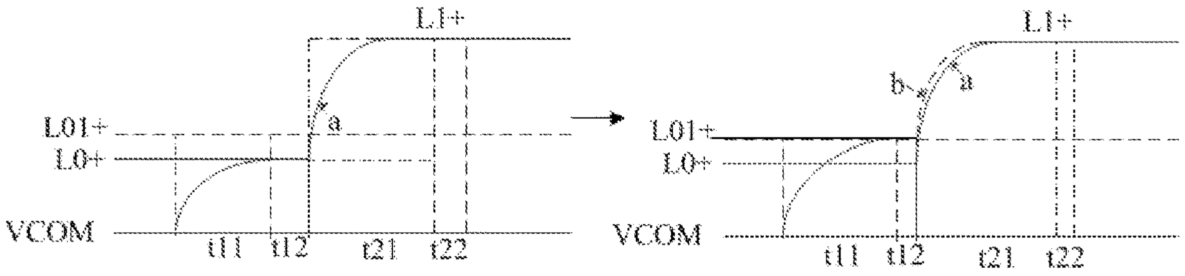
FIG. 8 is a schematic diagram of a first waveform of pixel charging in accordance with another embodiment of the present application.
Figure 9:
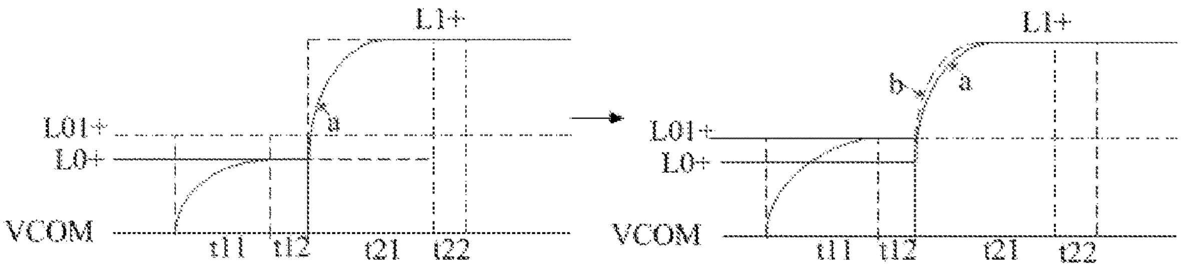
FIG. 9 is a schematic diagram of a second waveform of pixel charging in accordance with another embodiment of the present application.

As shown in FIGS. 7 to 9, optionally, the driving method also includes a step of boosting the binding-point voltage to a preset binding-point voltage and increasing a charging time of each pixel to a preset charging time in case that the voltage difference between the binding-point voltage and the common-electrode voltage VCOM is smaller than the preset voltage difference.

In this embodiment, when it is detected that the voltage difference between the binding-point voltage of positive or negative polarity and the common-electrode voltage is smaller than the preset voltage difference, indicating that the data signal has a ramp-up, and the problem of bright and dark lines is existed, the binding-point voltage of the green pixel G or blue pixel B is boosted in one aspect, and the charging time of each pixel is increased in another aspect, so that the overall charging time is increased, the brightness of pixels will become brighter, in this way, a gap between brightness and darkness will be smaller, and after all pixels become brighter, the difference between brightness and darkness is non-obvious.

As shown in FIG. 8, for example, with regard to the red pixel R, before refreshing to the green pixel G or blue pixel B in the next row, the red pixel R, by increasing the charging time, can reliably rise to the boosted charging voltage, which can ensure that the binding-point voltage of the blue pixel B or the green pixel G is raised to the boosted binding-point voltage before charging itself. Meanwhile, with regard to the blue pixel B or the green pixel G, it can be guaranteed that the blue pixel B or green pixel G can be reliably charged to the target voltage corresponding to the target gray scale based on the binding-point voltage, which increases the charging rate.

In this embodiment, to prevent the simultaneous charging of two adjacent rows, resulting in abnormal display, a refresh time of line scan includes the charging time of pixel and an error-proof charging time (i.e., a dead time). Optionally, the charging time is equal to a difference between the refresh time and the dead time of each row of pixels.

For example, take FHD 165 Hz display panel 1 (resolution: 1080*1920) as an example: the refresh time of one line scan is 5.46 us, the line scan time is equal to a sum of the charging time and the dead time, and a range of the dead time is set at 1~1.3 us, in this case, the charging time is 4.16~4.46 us. An increasing of the overall charging time can improve the brightness of the pixels during the ramp-up of the charging voltage of the data line and reduce the brightness difference.

Corresponding to a relationship between the refresh time and the charging time, the steps of boosting the binding-point voltage and increasing the charging time of each pixel in case that the voltage difference between the binding-point voltage and the common-electrode voltage is smaller than the preset voltage difference specifically include steps of:

- maintaining the refresh time of each row of pixels unchanged, and increasing the charging time of each pixel to the preset charging time in case that the voltage difference between the binding-point voltage and the common-electrode voltage is smaller than the preset voltage difference; or alternatively,
- maintaining the dead time of each row of pixels unchanged, and increasing the refresh time of each pixel, to enable the charging time of each pixel to be increased to the preset charging time in case that the voltage difference between the binding-point voltage and the common-electrode voltage is smaller than the preset voltage difference.

In this embodiment, as shown in FIG. 8 and FIG. 9, the charging time of line scan may be changed by changing the refresh time without changing the dead time, or alternatively, the charging time is changed by changing the dead time instead of changing the refresh time.

As shown in FIG. 8, the left side is a schematic diagram of an original charging waveform of each pixel, and the right side is a schematic diagram of the charging waveform of each pixel having the charging time and binding-point voltage being changed. t11 is the charging time of the red pixel R, t12 is the dead time of the red pixel R, the sum of t11 and t12 is the refresh time, t21 is the charging time of the green pixel G or blue pixel B, and t22 is the dead time of the green pixel G or blue pixel B.

In a case that the refresh time remains unchanged, with regard to the red pixel R, before refreshing to the green pixel G or blue pixel B in the next row, the red pixel R, by increasing the charging time t11 and reducing the dead time t12, can reliably rise to the boosted charging voltage, which can ensure that the binding-point voltage of the blue pixel B or green pixel G is raised to the boosted binding-point voltage before charging itself. Meanwhile, with regard to the blue pixel B or green pixel G, it can be guaranteed that the blue pixel B or green pixel G, by increasing the charging time t21 and reducing the dead time t22, can be reliably charged to the target voltage corresponding to the target gray scale based on the binding-point voltage, which increases the charging rate.

Or alternatively, as shown in FIG. 9, in case that the dead time in each refresh remains unchanged, an increasing of the refresh time will then result in an increasing of the charging time. With regard to the red pixel R, before refreshing to the green pixel G or blue pixel B in the next row, the red pixel R, by increasing the charging time t11, can reliably rise to the boosted charging voltage, i.e., the voltage of gamma7 or gamma8, which can ensure that the binding-point voltage of the blue pixel B or the green pixel G is raised to the boosted binding-point voltage before charging itself. Meanwhile, with regard to the blue pixel B or the green pixel G, it can be guaranteed that the blue pixel B or green pixel G, by increasing the charging time t21 and reducing the dead time t22, can be reliably charged to the target voltage corresponding to the target gray scale based on the binding-point voltage, which increases the charging rate.

As shown in FIG. 10 to FIG. 13, optionally, the driving method also includes a step S60.

In step S60, a voltage compensation is performed on the target voltage corresponding to the target gray scale of the green pixel G and the blue pixel B, and on the charging voltage of the red pixel R by invoking data in a preset data mapping table.

Figure 10:
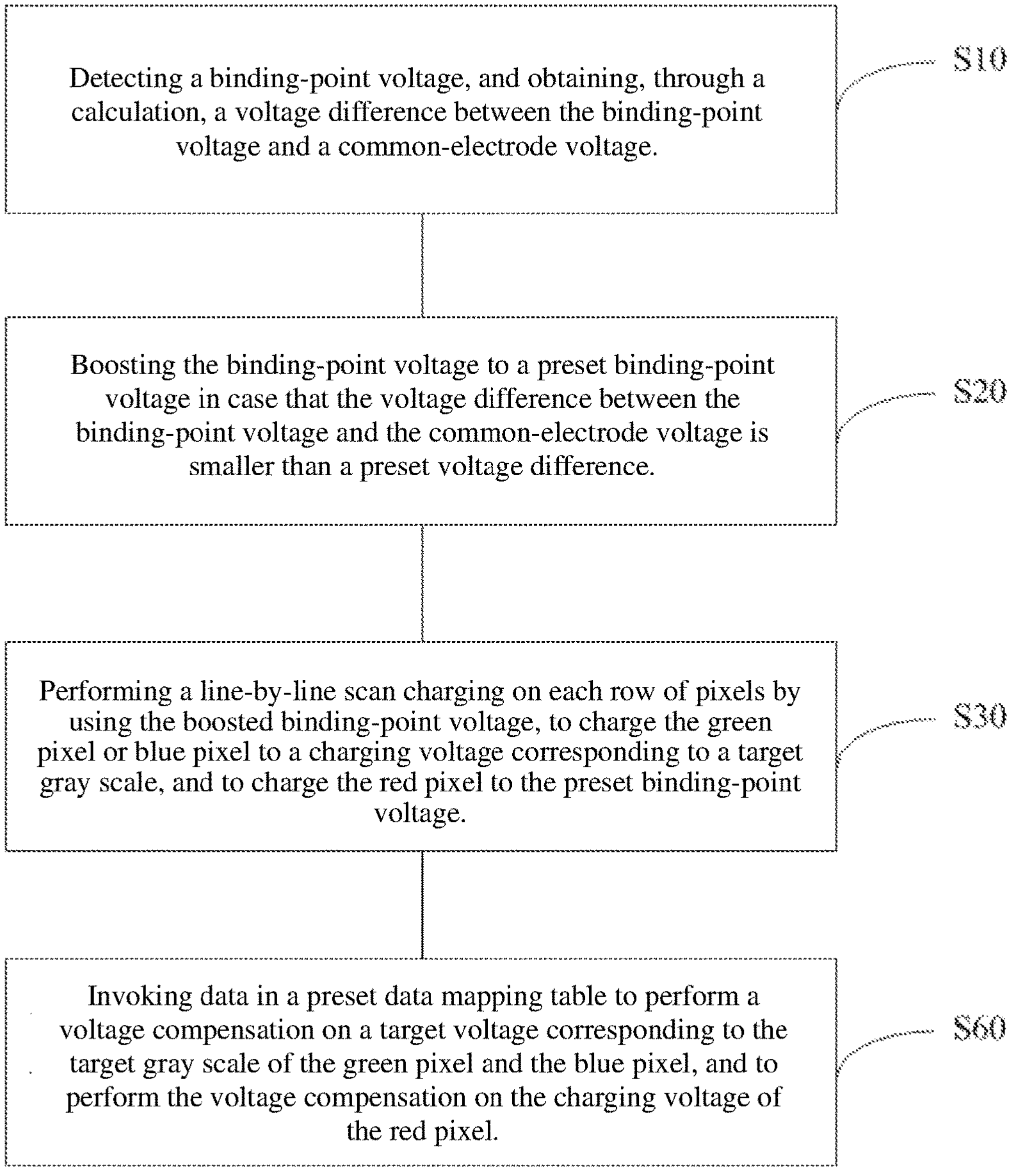
FIG. 10 is a first schematic flowchart of a driving method for the display panel in accordance with another embodiment of the present application.
Figure 11:
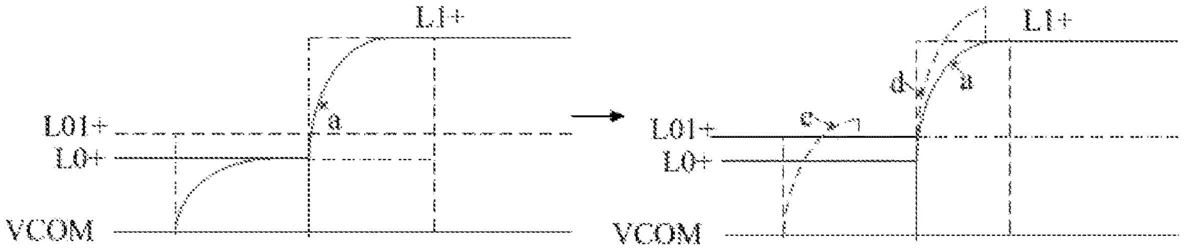
FIG. 11 is a schematic diagram of a first waveform of pixel charging in accordance with another embodiment of the present application.

As shown in FIG. 10 and FIG. 11, in case that the charging time of each pixel remains unchanged, when it is detected that the voltage difference between the binding-point voltage of positive or negative polarity and the common-electrode voltage VCOM is smaller than the preset voltage difference, indicating that the data signal has a ramp-up, and the problem of bright and dark lines is existed, the binding-point voltage of the green pixel G or blue pixel B is boosted in one aspect, and the charging voltage of the red pixel R, i.e., the voltage of gamma7 or gamma8, and the target voltage of the green pixel G and blue pixel B are compensated in an overdrive mode in another aspect, to further ensure that the charging voltage of the red pixel R, the target voltage of the green pixel G and blue pixel B reaches a preset voltage. As shown in FIG. 11, d represents a charging curve where the over-drive mode for voltage compensation is further adopted on the basis of the boosted binding-point voltage of blue pixel B or green pixel G; and e represents a charging curve where the over-drive mode for voltage compensation is further adopted and performed on the red pixel R on the basis of the boosted binding-point voltage of blue pixel B or green pixel G, to further ensure that the red pixel R, blue pixel B or green pixel G are reliably charged to the required charging voltage, thereby increasing the charging rate, and improving bright and dark lines.

Figure 12:
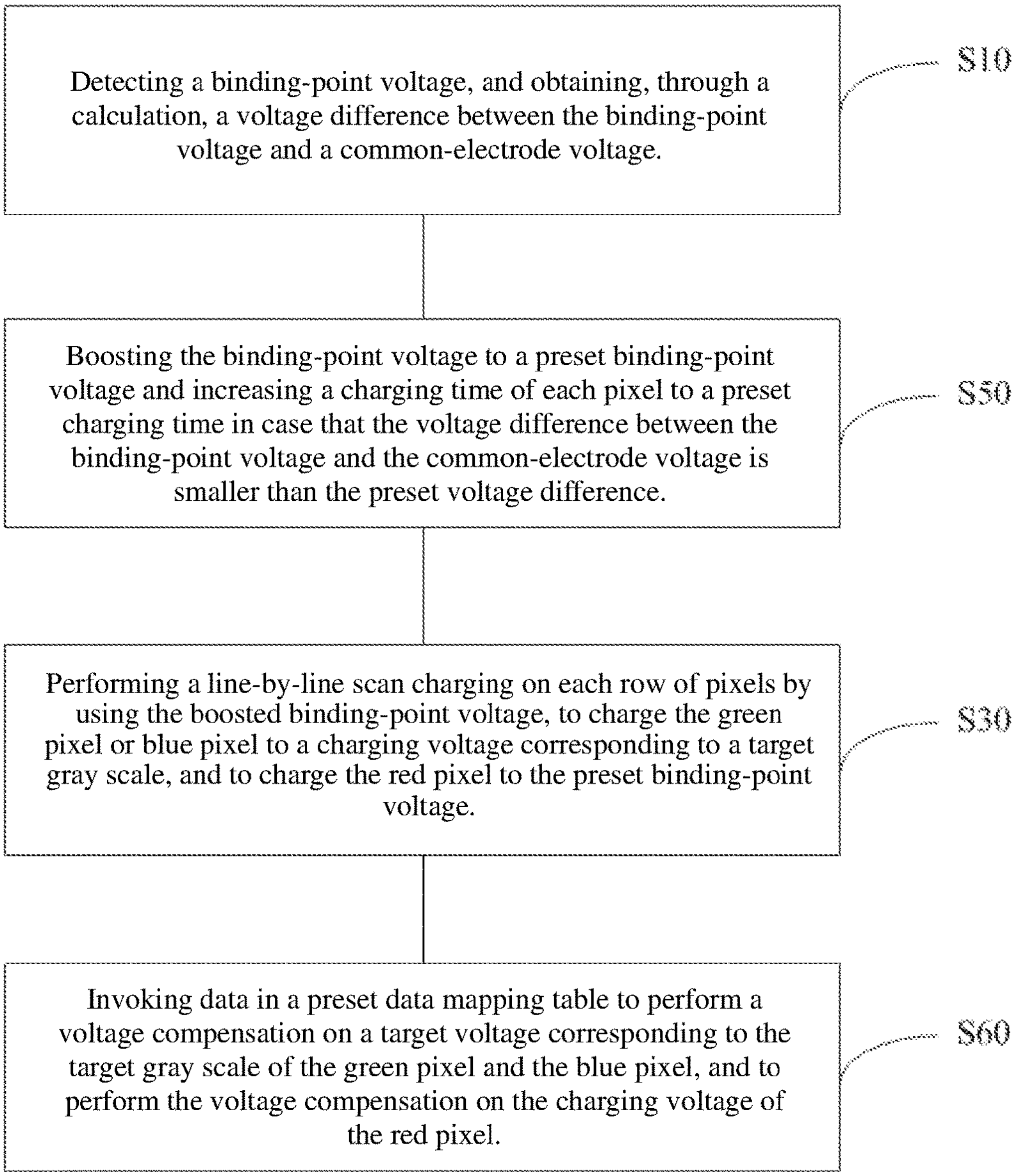
FIG. 12 is a second schematic flowchart of a driving method for the display panel in accordance with another embodiment of the present application.
Figure 13:
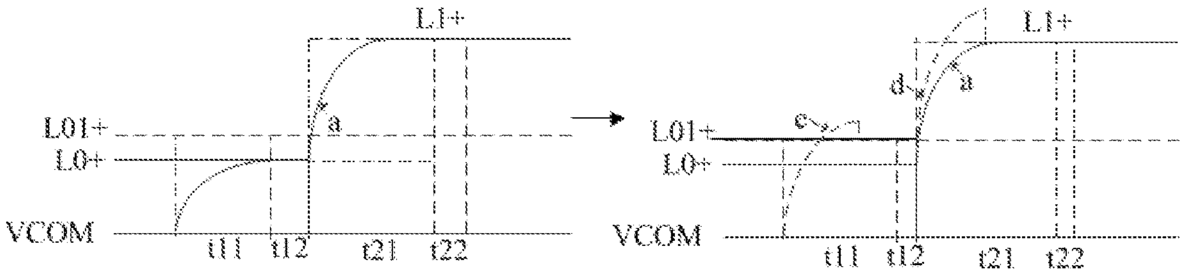
FIG. 13 is a schematic diagram of a second waveform of pixel charging in accordance with another embodiment of the present application.

Or alternatively, as shown in FIG. 12 and FIG. 13, when it is detected that the voltage difference between the binding-point voltage of positive or negative polarity and the common-electrode voltage VCOM is smaller than the preset voltage difference, indicating that the data signal has a ramp-up and the problem of bright and dark lines is existed, the binding-point voltage of green pixel G or blue pixel B is boosted in one aspect, and the charging time of each pixel is increased in another aspect, so that the overall charging time is increased, the brightness of pixels will become brighter, in this way, the gap between brightness and darkness will be smaller, and after all pixels become brighter, the difference between brightness and darkness is non-obvious.

In a further aspect, the charging voltage of the red pixel R, i.e., the voltage of gamma7 or gamma8, and the target voltage of the green pixel G and blue pixel B are compensated in an overdrive mode, to further ensure that the charging voltage of the red pixel R, the target voltage of the green pixel G and blue pixel B reaches the preset voltage. As shown in FIG. 13, d represents a charging curve where the over-drive mode for voltage compensation and an increasing of charging time are further adopted on the basis of the boosted binding-point voltage of blue pixel B or green pixel G; and e represents a charging curve where the over-drive mode for voltage compensation and an increasing of charging time are further applied on the red pixel R on the basis of the boosted binding-point voltage of blue pixel B or green pixel G, to further ensure that the red pixel R, blue pixel B or green pixel G are reliably charged to the required charging voltage, thereby increasing the charging rate, and improving bright and dark lines.

Figure 14:
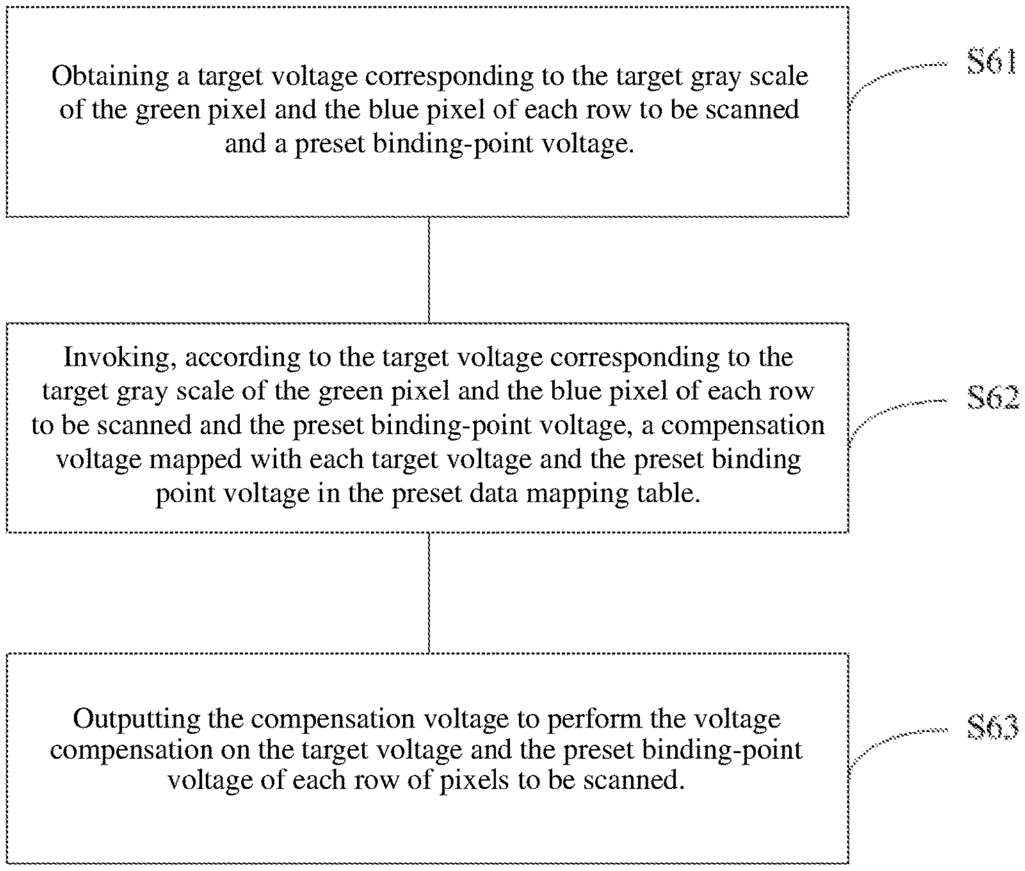
FIG. 14 is a schematic flowchart of step S60 in a driving method for the display panel in accordance with another embodiment of the present application.
Figure 15:
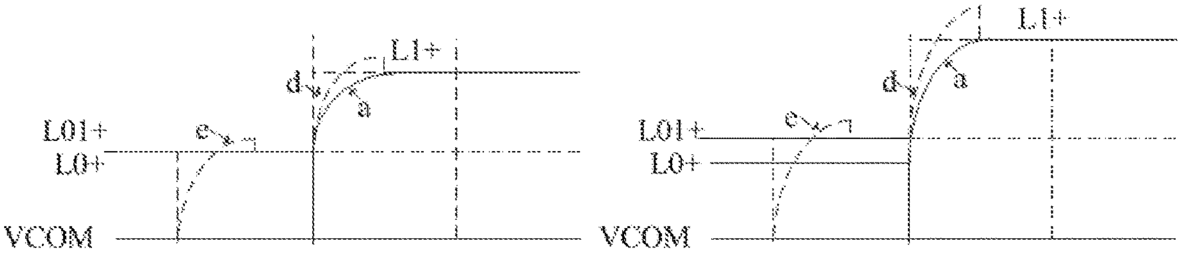
FIG. 15 is a schematic waveform diagram of pixel charging in accordance with another embodiment of the present application.

As shown in FIG. 14 and FIG. 15, optionally, the step of invoking the data in the preset data mapping table to perform a voltage compensation on the target voltage corresponding to the target gray scale of the green pixel G and the blue pixel B, and on the charging voltage of the red pixel R specifically include steps S61 to S63.

In step S61, the target voltage corresponding to the target gray scale of the green pixel G and the blue pixel B in each row to be scanned and the preset binding-point voltage are obtained.

In step S62, a compensation voltage that is mapped with each target voltage and the preset binding-point voltage in the preset data mapping table is invoked according to the target voltage corresponding to the target gray scale of the green pixel G and the blue pixel B of each row to be scanned and the preset binding-point voltage.

In step S63, the compensation voltage is output to perform the voltage compensation on the target voltage and the preset binding-point voltage of each row of pixels to be scanned.

In this embodiment, since the final target voltages of blue pixel B and green pixel G may be the same or different, different compensation voltages are set according to the preset binding-point voltage and target voltage required by each pixel, that is, in the line driving process, the data in the preset data mapping table is correspondingly invoked to compensate the target voltage and the preset binding-point voltage of each pixel to further ensure that the blue pixel B or green pixel G is reliably charged to the required target charging voltage on the basis of the binding-point voltage, thereby increasing the charging rate and improving bright and dark lines.

In this embodiment, the binding-point voltage of each green pixel G or blue pixel B and the binding-point voltage corresponding to the target voltage, that may lead to a switching of high-and-low voltage, are pre-stored in the preset data mapping table, and a mapping relationship is formed the two. When a polarity reversal occurs in one row is identified, the compensation voltage on each data line of the corresponding row is invoked to perform a voltage compensation respectively when the switching of high-and-low voltage occurs, thereby improving the efficiency of voltage compensation.

In this embodiment, as shown in FIG. 15 and Table 1, optionally, the magnitude of the compensation voltage varies in a positive correlation with the magnitude of the target voltage of each row of pixels and the magnitude of the preset binding-point voltage. That is, the compensation voltage provided will be larger when the boosted preset binding-point voltage is larger, and the compensation voltage provided will be smaller when the boosted preset binding-point voltage is smaller. The compensation voltage provided is smaller when the target voltage corresponding to the target gray scale is smaller, and the compensation voltage provided is larger when the target voltage corresponding to the target gray scale is larger, such that the compensation matching different voltage levels can be met, the problem of overcharging or undercharging can be avoided, and thus the efficiency and reliability of voltage compensation are improved.

TABLE 1

| Preset Binding-point Voltage (V) | Compensation Voltage (V) | Target Voltage (V) | Compensation Voltage (V) |
|---|---|---|---|
| 4 | 6 | 6 | 8 |
| 6 | 8 | 10 | 12 |
| . . . | . . . | . . . | . . . |
| 12 | 14 | 14 | 16 |

Figure 16:
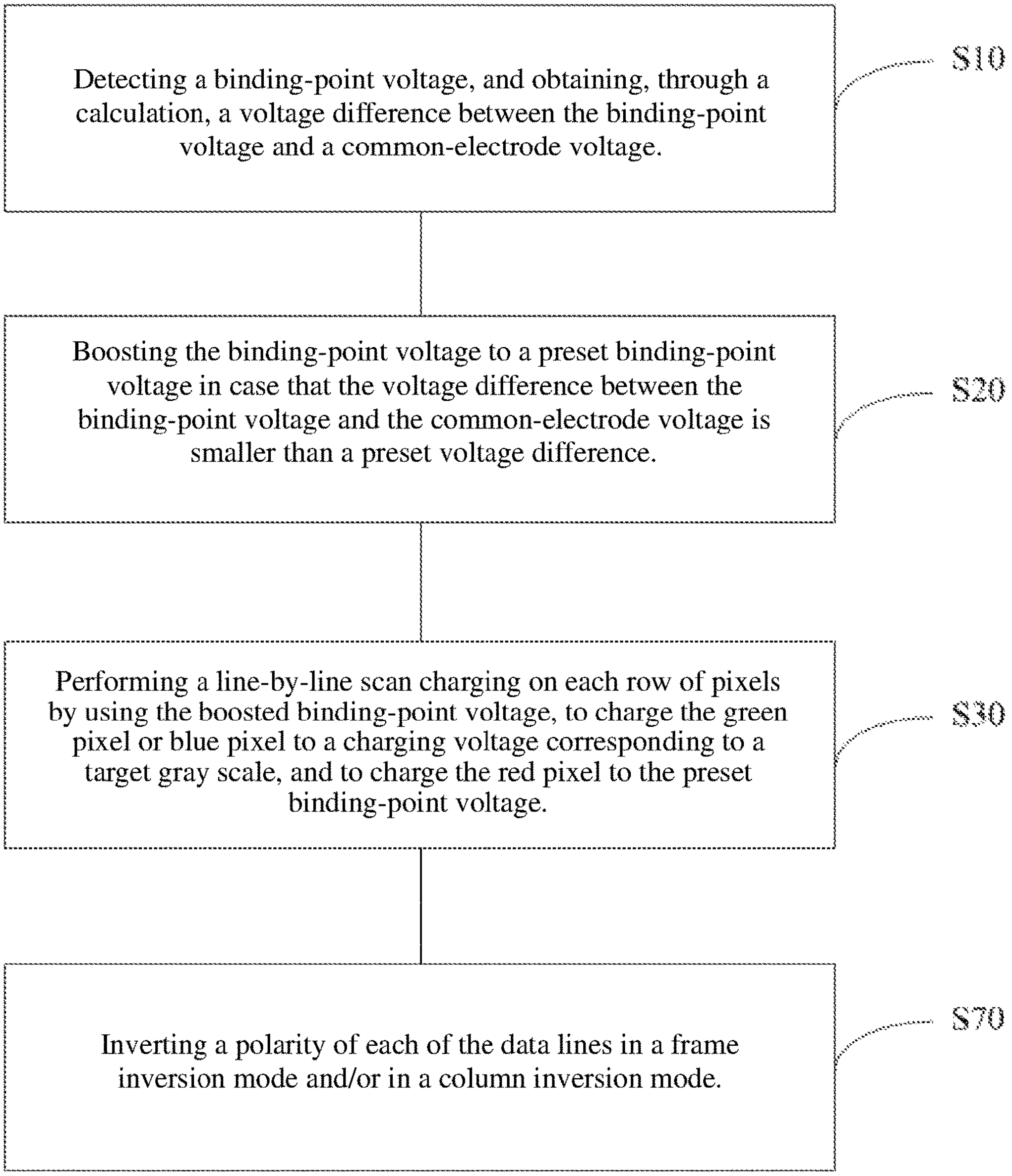
FIG. 16 is a schematic flowchart of a driving method for the display panel in accordance with yet another embodiment of the present application.

Optionally, as shown in FIG. 16, the driving method also includes a step of inverting the polarity of each data line in frame inversion mode and/or column inversion mode;

In this embodiment, the frame inversion mode is that: a polarity of a data line in one frame and a polarity of the same data line in an adjacent frame are opposite;

The column inversion mode is that: the polarities of adjacent data lines in the same frame are opposite.

In this embodiment, referring to FIG. 1, to reduce the power consumption, realize the color mixing, and improve the display effect, each pixel is also subjected to a drive control of frame inversion or column inversion. In the same frame, the polarities of adjacent data lines are opposite, thus, for the same column of pixels, which have a polarity of positive, negative, positive, etc. or negative, positive, and negative in turn, so that the dot inversion is realized, which can reduce power consumption. Moreover, the function of wide viewing angle is realized, which then can optimize the display effect.

And/or, the polarity inversion is performed in different frames, that is, for the same data line, the polarity inversion is performed in adjacent frames, and for each pixel, the dot inversion is realized in the previous frame and the next frame, so that the power consumption can be reduced, and the function of wide viewing angle is realized which then can optimize the display effect.

Figure 17:
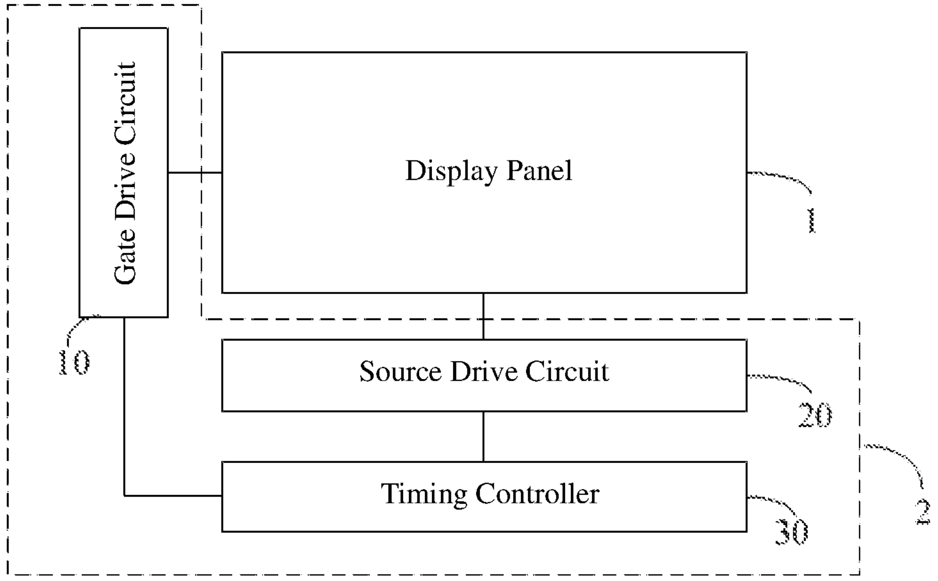
FIG. 17 is a schematic structural diagram of a driving circuit for the display panel in accordance with an embodiment of the present application.

A second aspect of the embodiments of the present application provides a driving circuit 2 for a display panel, as shown in FIG. 17, a source drive circuit 20, a gate drive circuit 10 and a timing controller 30 are included in the driving circuit. The timing controller 30 is connected to the source drive circuit 20 and the gate drive circuit 10, respectively. The source drive circuit 20 is also connected to the data lines of the display panel 1, and the gate drive circuit 10 is also connected to the scan lines of the display panel 1. The timing controller 30 includes a memory, a processor, and a display-panel driver program stored on the memory and executable on the processor. The display-panel driver program, when executed by the processor, causes the above driving method for the display panel 1 to be implemented.

In this embodiment, the timing controller 30, as an execution subject, is configured to control operations of the source drive circuit 20 and the gate drive circuit 10 respectively during a normal driving. That is, control signals are output by the timing controller 30 to the source drive circuit 20 and the gate drive circuit 10 respectively. The control signal includes a start signal, a clock signal, a polarity inversion control signal, an enable signal, etc. The gate drive circuit 10 outputs a line scan signal to the scan line according to the control signal to achieve a line-by-line scan, including a forward scan or a reverse scan. Meanwhile, the source driver circuit 20 outputs a corresponding charging voltage to the pixels of each row according to the control signal when the pixels of each row are switched on, so that the pixels in each row are switched on to emit light.

In the meantime, the magnitude of the binding-point voltage is detected by the timing controller 30 through a built-in voltage detection circuit or an additional voltage detection circuit to determine a display state of the display panel 1, and the magnitude of an output voltage of the source driver circuit 20 or the gamma circuit, and the charging time of each pixel is adjusted accordingly by the timing controller 30, to implement a charging adjustment of each pixel, including adjustments to the corresponding binding-point voltage, target charging voltage, charging time, voltage compensation and other adjustments.

In this embodiment, the timing controller 30 carries out data debugging before the display panel 1 formally displays a screen or before leaving the factory. It is ensured, by obtaining the required binding-point voltage and target voltage of each row of pixels, the refresh time of the line scan, and the required compensation voltage, and adjusting correspondingly the binding-point voltage, the target voltage, the charging time of line scan, and the required compensation voltage, that the blue pixel B or green pixel G can be reliably charged to the target voltage corresponding to the target gray scale on the basis of the binding-point voltage, which increases the charging rate, and improves bright and dark lines.

Figure 18:
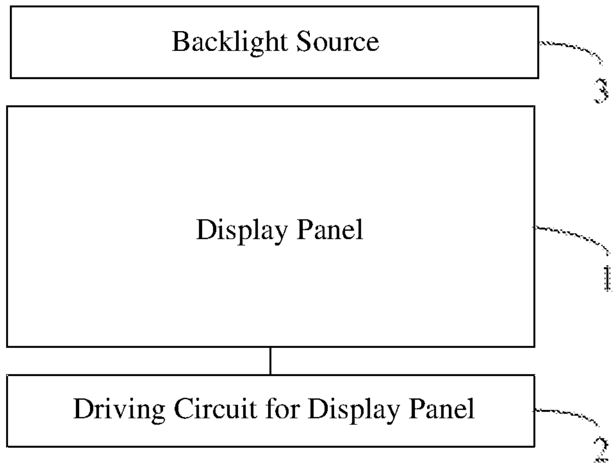
FIG. 18 is a schematic structural diagram of a display device in accordance with an embodiment of the present application.

A third aspect of the embodiments of the present application further provides a display device. As shown in FIG. 18, the display device includes a backlight source 3, a display panel 1, and a drive circuit 2 for the display panel. For a specific structure of the drive circuit 2 for the display panel, references may be made to the above-mentioned embodiments, since the display device here includes all solutions of the above embodiments, the display device has at least all the beneficial effects brought by the solutions of the above embodiments, which will not be repeated here. Here, the display panel 1 is correspondingly connected with the driving circuit 2 for the display panel.

In this embodiment, the driving circuit 2 for the display panel scans and lights up the display panel 1 line by line to realize the normal driving, and cooperates with the backlight source 3 to display corresponding image information.

Here, a plurality of pixels in the same column of the display panel 1 are sequentially cross-connected to data lines in two adjacent columns, and a plurality of pixels in the same row are respectively connected to data lines in different columns, and pixels in each row are respectively connected to the same scan line. The scan line may be a single line arranged between pixels in adjacent rows or may be double lines arranged between pixels in adjacent rows, the arrangement of data lines will not be limited in here, and pixels in the same column are pixels of the same type.

The above-mentioned are merely some optional embodiments of the present application and are not intended to limit the present application. Although the present application has been described in detail with reference to the foregoing embodiments, those of ordinary skill in the art should understand that the solutions described in the foregoing embodiments may still be modified, or some of the features may be equivalently replaced; and these modifications or replacements do not make the essence of the corresponding solutions deviate from the spirit and scope of the solutions of the various embodiments of the application, and should all be included within the protection scope of the present application.

What is claimed is:

1. A driving method for a display panel, the display panel comprising a plurality of data lines, a plurality of scan lines and a plurality of pixel groups arranged in an array, each pixel group comprising a red pixel, a green pixel and a blue pixel, arranged in sequence along a row direction, multiple pixels in a same column are sequentially cross-connected to data lines in two adjacent columns, and multiple pixels in a same row are respectively connected to data lines in different columns;

wherein a binding-point voltage corresponding to a gray scale of a binding point of the green pixel or the blue pixel is equal to a charging voltage of the red pixel;

the driving method for the display panel comprising:

detecting the binding-point voltage and obtaining, through a calculation, a voltage difference between the binding-point voltage and a common-electrode voltage;

boosting the binding-point voltage to a preset binding-point voltage when the voltage difference between the binding-point voltage and the common-electrode voltage is smaller than a preset voltage difference; and performing a line-by-line scan charging on each row of pixels by using the boosted binding-point voltage to charge the green pixel or the blue pixel to a charging voltage corresponding to a target gray scale, and to charge the red pixel to the preset binding-point voltage.

2. The driving method for the display panel according to claim 1, wherein the binding-point voltage comprises a binding-point voltage of positive polarity and a binding-point voltage of negative polarity, and the preset binding-point voltage comprises a preset binding-point voltage of positive polarity and a preset binding-point voltage of negative polarity;

said boosting the binding-point voltage to a preset binding-point voltage when the voltage difference between the binding-point voltage and the common-electrode voltage is smaller than a preset voltage difference further comprises:

boosting the binding-point voltage of positive polarity to the preset binding-point voltage of positive polarity when a voltage difference between the binding-point voltage of positive polarity and the common-electrode voltage is smaller than the preset voltage difference; and boosting the binding-point voltage of negative polarity to the preset binding-point voltage of negative polarity when a voltage difference between the binding-point voltage of negative polarity and the common-electrode voltage is smaller than the preset voltage difference.

3. The driving method for the display panel according to claim 2, further comprising:

boosting the binding-point voltage to the preset binding-point voltage and increasing a charging time of each pixel to a preset charging time when the voltage difference between the binding-point voltage and the common-electrode voltage is smaller than the preset voltage difference.

4. The driving method for the display panel according to claim 3, wherein the charging time is equal to a difference between a refresh time and a dead time of each row of pixels;

said boosting the binding-point voltage and increasing the charging time of each pixel when the voltage difference between the binding-point voltage and the common-electrode voltage is smaller than the preset voltage difference further comprises:

maintaining the refresh time of each row of pixels unchanged, and increasing the charging time of each pixel to the preset charging time when the voltage difference between the binding-point voltage and the common-electrode voltage is smaller than the preset voltage difference;

or maintaining the dead time of each row of pixels unchanged, and increasing the refresh time of each pixel, to enable the charging time of each pixel to be increased to the preset charging time when the voltage difference between the binding-point voltage and the common-electrode voltage is smaller than the preset voltage difference.

5. The driving method for the display panel according to claim 4, further comprising:

invoking data in a preset data mapping table to perform a voltage compensation on a target voltage corresponding to the target gray scale of the green pixel and the blue pixel, and to perform the voltage compensation on the charging voltage of the red pixel.

6. The driving method for the display panel according to claim 5, wherein said invoking data in the preset data mapping table to perform the voltage compensation on a target voltage corresponding to the target gray scale of the green pixel and the blue pixel, and to perform the voltage compensation on the charging voltage of the red pixel, further comprises:

obtaining the target voltage corresponding to the target gray scale of the green pixel and the blue pixel of each row to be scanned and the preset binding-point voltage;

invoking, according to the target voltage corresponding to the target gray scale of the green pixel and the blue pixel of each row to be scanned and the preset binding-point voltage, a compensation voltage mapped with each target voltage and the preset binding point voltage in the preset data mapping table; and outputting the compensation voltage to perform the voltage compensation on the target voltage and the preset binding-point voltage of each row of pixels to be scanned.

7. The driving method for the display panel according to claim 6, wherein a magnitude of the compensation voltage is in a positive correlation with the target voltage of each row of pixels and the magnitude of the preset binding-point voltage.

8. The driving method for the display panel according to claim 1, further comprising:

inverting a polarity of each of the data lines in a frame inversion mode and/or in a column inversion mode;

wherein the frame inversion mode is that a polarity of a data line in one frame and a polarity of the same data line in an adjacent frame are opposite; and the column inversion mode is that the polarities of adjacent data lines in a same frame are opposite.

9. A driving circuit for a display panel, the display panel comprising a plurality of data lines, a plurality of scan lines and a plurality of pixel groups arranged in an array, each pixel group comprising a red pixel, a green pixel and a blue pixel, arranged in sequence along a row direction, multiple pixels in a same column are sequentially cross-connected to data lines in two adjacent columns, and multiple pixels in a same row are respectively connected to data lines in different columns, wherein a binding-point voltage corresponding to a gray scale of a binding point of the green pixel or the blue pixel is equal to a charging voltage of the red pixel;

the driving circuit comprising:

a source drive circuit, connected to the plurality of data lines of the display panel;

a gate drive circuit; connected to the plurality of scan lines of the display panel; and a timing controller, connected to the source drive circuit and the gate drive circuit respectively, the timing controller comprising a memory, a processor and a display-panel driver program stored in the memory and executable on the processor, wherein the display-panel driver program, when executed by the processor, causes the processor to perform operations that comprise:

detecting the binding-point voltage and obtaining, through a calculation, a voltage difference between the binding-point voltage and a common-electrode voltage;

boosting the binding-point voltage to a preset binding-point voltage when the voltage difference between the binding-point voltage and the common-electrode voltage is smaller than a preset voltage difference; and performing a line-by-line scan charging on each row of pixels by using the boosted binding-point voltage to charge the green pixel or the blue pixel to a charging voltage corresponding to a target gray scale, and to charge the red pixel to the preset binding-point voltage.

10. The driving circuit for the display panel according to claim 9, wherein the binding-point voltage comprises a binding-point voltage of positive polarity and a binding-point voltage of negative polarity, and the preset binding-point voltage comprises a preset binding-point voltage of positive polarity and a preset binding-point voltage of negative polarity;

the operation of boosting the binding-point voltage to a preset binding-point voltage when the voltage difference between the binding-point voltage and the common-electrode voltage is smaller than a preset voltage difference further comprises:

boosting the binding-point voltage of positive polarity to the preset binding-point voltage of positive polarity when a voltage difference between the binding-point voltage of positive polarity and the common-electrode voltage is smaller than the preset voltage difference; and boosting the binding-point voltage of negative polarity to the preset binding-point voltage of negative polarity when a voltage difference between the binding-point voltage of negative polarity and the common-electrode voltage is smaller than the preset voltage difference.

11. The driving circuit for the display panel according to claim 10, wherein the operations further comprise:

boosting the binding-point voltage to the preset binding-point voltage and increasing a charging time of each pixel to a preset charging time when the voltage difference between the binding-point voltage and the common-electrode voltage is smaller than the preset voltage difference.

12. The driving circuit for the display panel according to claim 11, wherein the charging time is equal to a difference between a refresh time and a dead time of each row of pixels;

said boosting the binding-point voltage and increasing the charging time of each pixel when the voltage difference between the binding-point voltage and the common-electrode voltage is smaller than the preset voltage difference further comprises:

maintaining the refresh time of each row of pixels unchanged, and increasing the charging time of each pixel to the preset charging time when the voltage difference between the binding-point voltage and the common-electrode voltage is smaller than the preset voltage difference;

or, maintaining the dead time of each row of pixels unchanged and increasing the refresh time of each pixel, to enable the charging time of each pixel to be increased to the preset charging time when the voltage difference between the binding-point voltage and the common-electrode voltage is smaller than the preset voltage difference.

13. The driving circuit for the display panel according to claim 12, wherein the operations further comprise:

invoking data in a preset data mapping table to perform a voltage compensation on a target voltage corresponding to the target gray scale of the green pixel and the blue pixel, and to perform the voltage compensation on the charging voltage of the red pixel.

14. The driving circuit for the display panel according to claim 13, wherein said invoking data in the preset data mapping table to perform the voltage compensation on a target voltage corresponding to the target gray scale of the green pixel and the blue pixel, and to perform the voltage compensation on the charging voltage of the red pixel, further comprises:

obtaining the target voltage corresponding to the target gray scale of the green pixel and the blue pixel of each row to be scanned and the preset binding-point voltage;

invoking, according to the target voltage corresponding to the target gray scale of the green pixel and the blue pixel of each row to be scanned and the preset binding-point voltage, a compensation voltage mapped with each target voltage and the preset binding point voltage in the preset data mapping table; and outputting the compensation voltage to perform the voltage compensation on the target voltage and the preset binding-point voltage of each row of pixels to be scanned.

15. The driving circuit for the display panel according to claim 14, wherein a magnitude of the compensation voltage is in a positive correlation with the target voltage of each row of pixels and the magnitude of the preset binding-point voltage.

16. The driving circuit for the display panel according to claim 9, wherein the operations further comprise:

inverting a polarity of each of the data lines in a frame inversion mode and/or in a column inversion mode;

wherein the frame inversion mode is that a polarity of a data line in one frame and a polarity of the same data line in an adjacent frame are opposite; and the column inversion mode is that the polarities of adjacent data lines in a same frame are opposite.

17. A display device, comprising:

a backlight source;

a display panel comprising a plurality of data lines, a plurality of scan lines and a plurality of pixel groups arranged in an array, each pixel group comprising a red pixel, a green pixel and a blue pixel, arranged in sequence along a row direction, multiple pixels in a same column are sequentially cross-connected to data lines in two adjacent columns, and multiple pixels in a same row are respectively connected to data lines in different columns, wherein a binding-point voltage corresponding to a gray scale of a binding point of the green pixel or the blue pixel is equal to a charging voltage of the red pixel; and a drive circuit for the display panel, the display panel being correspondingly connected to the drive circuit for the display panel, the driving circuit comprising:

a source drive circuit connected to the plurality of data lines of the display panel;

a gate drive circuit connected to the plurality of scan lines of the display panel; and a timing controller connected to the source drive circuit and the gate drive circuit respectively, the timing controller comprising a memory, a processor and a display-panel driver program stored in the memory and executable on the processor, wherein the display-panel driver program, when executed by the processor, causes the processor to perform operations that comprise:

detecting the binding-point voltage and obtaining, through a calculation, a voltage difference between the binding-point voltage and a common-electrode voltage;

boosting the binding-point voltage to a preset binding-point voltage when the voltage difference between the binding-point voltage and the common-electrode voltage is smaller than a preset voltage difference; and performing a line-by-line scan charging on each row of pixels by using the boosted binding-point voltage to charge the green pixel or the blue pixel to a charging voltage corresponding to a target gray scale, and to charge the red pixel to the preset binding-point voltage.

18. The display device according to claim 17, wherein the binding-point voltage comprises a binding-point voltage of positive polarity and a binding-point voltage of negative polarity, and the preset binding-point voltage comprises a preset binding-point voltage of positive polarity and a preset binding-point voltage of negative polarity;

the operation of boosting the binding-point voltage to a preset binding-point voltage when the voltage difference between the binding-point voltage and the common-electrode voltage is smaller than a preset voltage difference further comprises:

boosting the binding-point voltage of positive polarity to the preset binding-point voltage of positive polarity when a voltage difference between the binding-point voltage of positive polarity and the common-electrode voltage is smaller than the preset voltage difference; and boosting the binding-point voltage of negative polarity to the preset binding-point voltage of negative polarity when a voltage difference between the binding-point voltage of negative polarity and the common-electrode voltage is smaller than the preset voltage difference.

19. The display device according to claim 18, wherein the operations further comprise:

boosting the binding-point voltage to the preset binding-point voltage and increasing a charging time of each pixel to a preset charging time when the voltage difference between the binding-point voltage and the common-electrode voltage is smaller than the preset voltage difference.

20. The display device according to claim 19, wherein the charging time is equal to a difference between a refresh time and a dead time of each row of pixels;

said boosting the binding-point voltage and increasing the charging time of each pixel when the voltage difference between the binding-point voltage and the common-electrode voltage is smaller than the preset voltage difference further comprises:

maintaining the refresh time of each row of pixels unchanged, and increasing the charging time of each pixel to the preset charging time when the voltage difference between the binding-point voltage and the common-electrode voltage is smaller than the preset voltage difference;

or maintaining the dead time of each row of pixels unchanged, and increasing the refresh time of each pixel, to enable the charging time of each pixel to be increased to the preset charging time when the voltage difference between the binding-point voltage and the common-electrode voltage is smaller than the preset voltage difference.

* * * * *